UNITED STATES PATENT OFFICE.

FRANCIS EDWARD MATTHEWS, HENRY JAMES WHEELER BLISS, AND HARRY MONTAGU ELDER, OF LONDON, ENGLAND.

MANUFACTURE OF UNSATURATED HYDROCARBONS.

1,198,943.      Specification of Letters Patent.      Patented Sept. 19, 1916.

No Drawing.      Application filed June 28, 1913. Serial No. 776,342.

*To all whom it may concern:*

Be it known that we, FRANCIS EDWARD MATTHEWS, of 50 City road, London, England, HENRY JAMES WHEELER BLISS, of Ingram House, Stockwell, London, England, and HARRY MONTAGU ELDER, of 28ᵇ Albemarle street, Piccadilly, London, England, all subjects of the King of Great Britain, have invented new and useful Improvements in the Manufacture of Unsaturated Hydrocarbons, of which the following is a specification.

In the preparation of unsaturated hydrocarbons from the halids of hydrocarbons by abstraction of halogen acid, the methods hitherto in use have depended upon the combination of the acid with alkalis or bases. The decomposition of some halids, to form unsaturated bodies by heat (for example, during distillation) or by treatment with, for example, aluminium chlorid, has also been observed. It has also been proposed to pass the vapors of the halids over certain contact substances such for example as barium chlorid, as a practical means of preparing certain unsaturated hydrocarbons, for example, the doubly unsaturated conjugated bodies.

We have now found that water, or steam, is a suitable agent for the preparation of unsaturated hydrocarbons from mono-, or di-, halids. The action of the water, or steam, may, if desired, be combined with the action of catalytic substances. The temperature required varies within wide limits, according to the halid used, but it should be the temperature at which halogen acid is freely evolved, above that at which glycol (or unsaturated alcohol) is formed and should be kept below that at which any considerable decomposition of the product occurs.

One method of preparing glycols has been to treat dihalids with water—although it is necessary in many cases to have lead oxid, or other basic oxid, or weak alkali, present to combine with the halogen acid evolved. It is also known that certain glycols of the pinacone type break down fairly readily to form doubly unsaturated hydrocarbons, and it has recently been shown (in the specification of application for British Letters Patent No. 3873 A. D. 1912) that other glycols may also be treated so as to yield unsaturated hydrocarbons.

According to our invention, doubly unsaturated hydrocarbons may be prepared from dihalids, in one operation, by treatment with water, or steam, at a suitable temperature, and with, or without, the use of catalysts.

In order to carry out this invention we subject the halid to the action of steam, at a suitable temperature, and this may conveniently be effected by passing the vapors of the di-halid, with steam, through a heated tube, or the di-halid and water may be vaporized in the tube itself, which may, or may not, contain a catalytic substance.

Suitable catalytic substances are those (for example, phosphoric acid) which split off water from alcohols, or glycols, or those which split off halogen acid (for example, the catalysts mentioned in Meyer & Jacobsen, Vol. 1 (1907) page 277 such as, cobalt chlorid, ferrous chlorid, lead chlorid, barium chlorid, nickel chlorid, or copper chlorid, or the corresponding bromids, or certain other halogen compounds, particularly aluminium bromid; but the use of these, or any, catalysts is not as a rule required if a sufficiently elevated temperature be used.

The following are examples of how this invention can be performed, but the invention is not limited to these examples.

Example 1: The mixed dichlorids obtained by chlorination of isoamyl chlorid in the manner described in the specification of the application for British Letters Patent No. 277 A. D. 1912, are distilled in steam in the usual manner—by passing steam through the liquid. The distillate contains a small proportion of isoprene.

Example 2: Instead of passing steam through the dichlorids mentioned in example 1, a mixture of water and the dichlorid is boiled, or it may be heated in a sealed tube to 200° centigrade, or thereabout; in the latter case, however, a considerable proportion of the hydrocarbon formed is polymerized.

Example 3: 2.3-dichlor-butane is allowed to flow with, say, an equal volume of water into a vessel which is maintained at a temperature of from about 600° to about 700° centigrade. Or the vapor of the dichlorid may be passed through a heated tube together with steam. The product is passed through a condenser in which the water and hydrochloric acid are condensed; if less than from two, to two and a half, parts of water to one part of dichlorid were taken, additional water may have to be used to complete the condensation of the hydrochloric acid. A gas passes off which contains butadiene, with some decomposition and other products. A proportion of unsaturated chlorid may be formed and condensed with the water. This may be separated and again treated to complete the removal of hydrochloric acid in accordance with specification of British Patent 17234/12. Other di-halids of butane or of other hydrocarbons may be treated in a manner similar to that described in this example.

The temperatures specified in the foregoing examples are suitable for carrying out the invention, but we do not limit ourselves to these temperatures. In general the temperature suitable for a particular di-halid is adjusted during the preparation by raising it until hydrochloric acid is freely evolved, which may be detected, for example by determining the acidity of the condensed water. The vessels or tubes may be made of a resistant material, for example silica.

We do not limit ourselves to any particular method of heating, which may be external, or internal, say by means of an electric resistance.

What we claim is:—

1. A process of making doubly unsaturated hydrocarbons, from dihalogen substitution derivatives of saturated aliphatic hydrocarbons which process comprises the step of heating the said derivatives with H₂O in a fluid condition to a temperature at which halogen acid is freely evolved, which temperature is above that at which the glycol corresponding to the dihalogen substitution product used would be dehydrated, but below that at which any considerable decomposition of the unsaturated hydrocarbon would take place.

2. A process of making doubly unsaturated hydrocarbons from dihalogen substitution derivatives of saturated aliphatic hydrocarbons, which process comprises the step of heating the said derivatives with H₂O in a fluid condition to a temperature at which halogen acid is freely evolved, which temperature is above that at which the glycol corresponding to the dihalogen substitution product used would be dehydrated, but below that at which any considerable decomposition of the unsaturated hydrocarbon would take place, in the presence of a catalyst capable of causing the splitting off of halogen acid.

3. A process of making doubly unsaturated hydrocarbons, which process comprises the step of heating dichlor substitution products of paraffin hydrocarbons with water, to a temperature not below 200° C.

4. A process of making butadiene by passing 2.3 dichlor-butane together with water through a tube heated to a temperature of from about 600° C. to about 700° C., substantially as described.

5. A process of making doubly unsaturated hydrocarbons from dihalogen substitution derivatives of saturated aliphatic hydrocarbons, which process comprises the step of heating said derivatives with water, to a temperature not below 200° C., but not above 700° C.

6. A process of making doubly unsaturated hydrocarbons from dihalogen substitution derivatives of saturated aliphatic hydrocarbons, which process comprises the step of heating said derivatives with water, to a temperature at which halogen acid is freely evolved, which temperature is above that at which the glycol corresponding to the dihalogen substitution product used would be dehydrated, but below that at which any considerable secondary decomposition takes place, in the presence of catalytic means capable of aiding in the splitting off of halogen acid from the dihalogen substitution product used, and capable of aiding in the splitting off of water from the glycol corresponding thereto.

7. The process of making unsaturated hydrocarbons which comprises the step of heating a dihalogen substitution derivative of an aliphatic hydrocarbon, said derivative containing the group

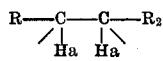

in which R and R₂ represent alkyl radicals or hydrogen and in which Ha represents a halogen element, with water, to a temperature above that at which water would be split off from the glycol corresponding to the dihalogen product employed, said temperature being materially above the boiling point of said halogen derivative.

In testimony whereof we have signed our names to this specification in the presence of two subscribing witnesses.

FRANCIS EDWARD MATTHEWS.
HENRY JAMES WHEELER BLISS.
HARRY MONTAGU ELDER.

Witnesses:
    JOHN ROWLAND WHINCOP,
    G. F. TYSON.